Dec. 20, 1966   A. W. POMPER   3,292,212
PELLETING APPARATUS
Filed May 27, 1964   2 Sheets-Sheet 1
FIG. 1
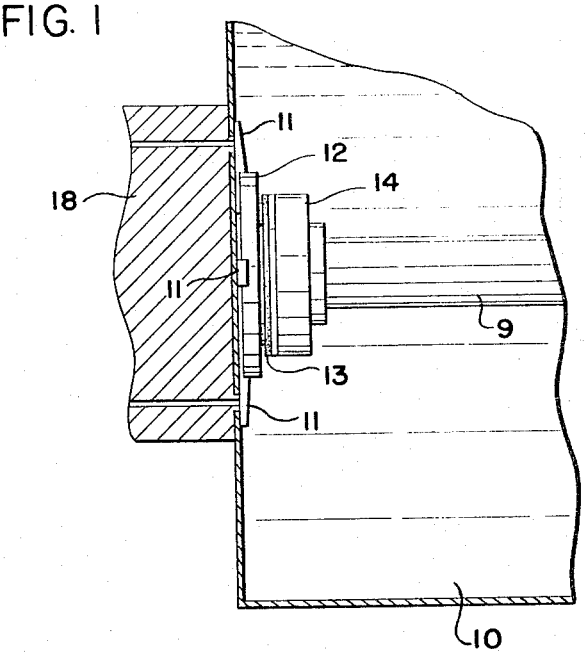
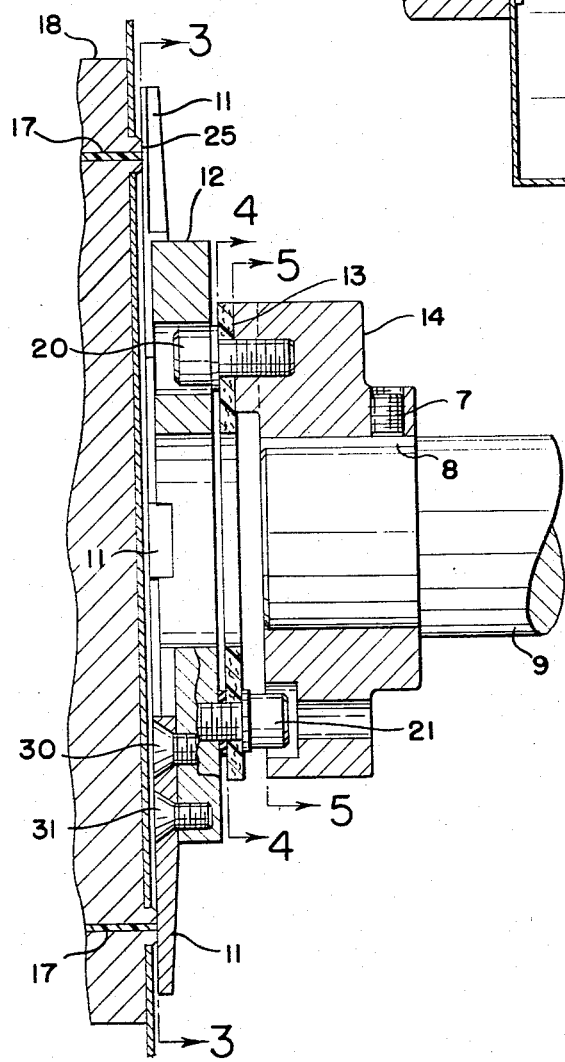
FIG. 2
INVENTOR.
ANTHONY W. POMPER
BY Thomas S. Mayner
ATTORNEY Dec. 20, 1966  A. W. POMPER  3,292,212
PELLETING APPARATUS
Filed May 27, 1964  2 Sheets-Sheet 2
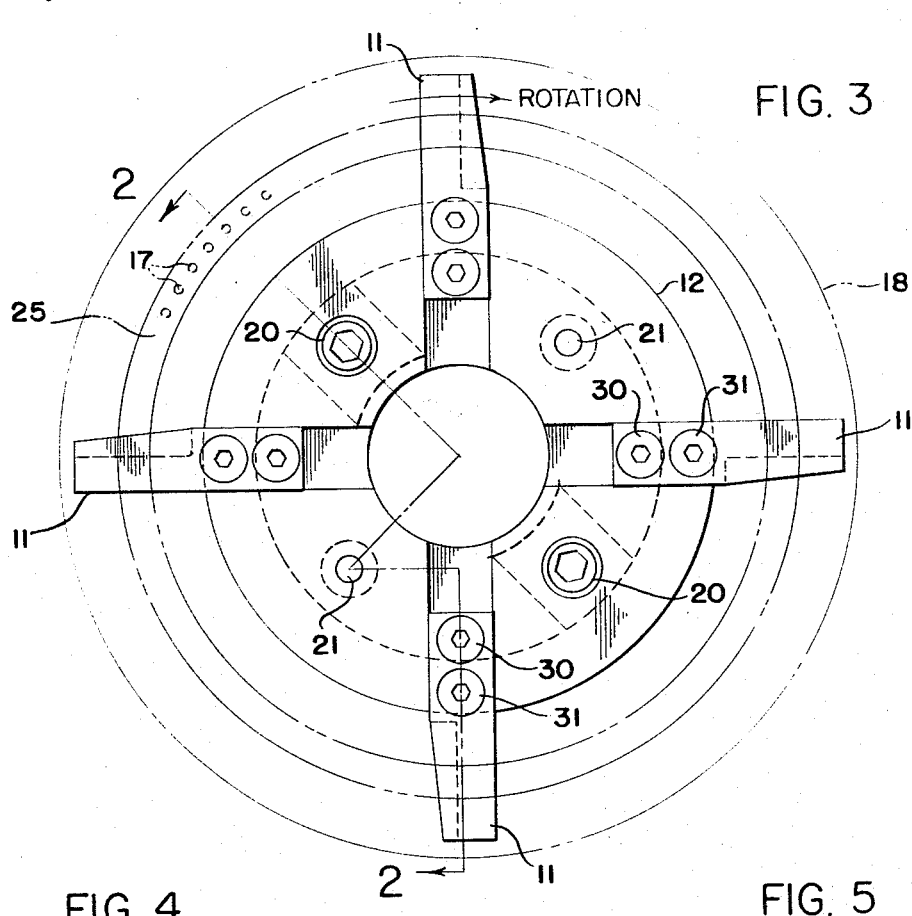
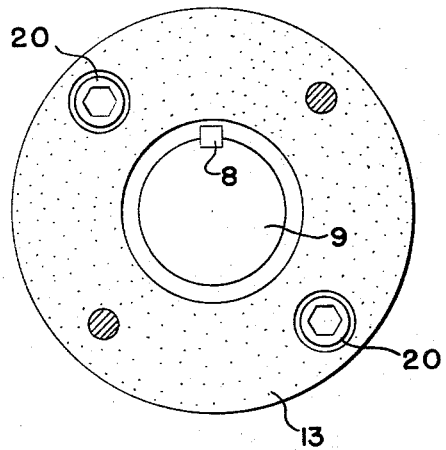
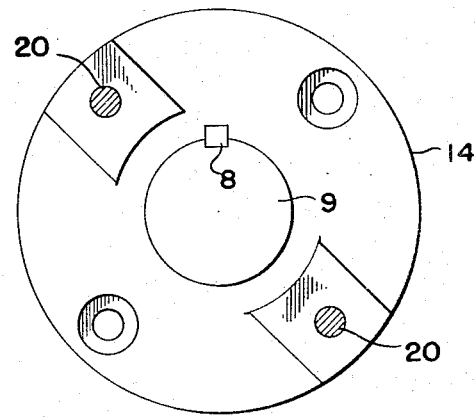
INVENTOR.
ANTHONY W. POMPER
BY
Thomas S. Maynes
ATTORNEY

United States Patent Office 3,292,212
Patented Dec. 20, 1966

3,292,212
PELLETING APPARATUS
Anthony W. Pomper, New Market, N.J., assignor to Midland-Ross Corporation, Cleveland, Ohio, a corporation of Ohio
Filed May 27, 1964, Ser. No. 370,618
5 Claims. (Cl. 18—12)

This invention relates to a pelleting apparatus of thermoplastic polymeric materials and, more particularly, to an improvement in such apparatus providing for longer service and a formation of more uniform pellets.

Pellets of thermoplastic polymers used in extrusion or injection processes, or in blow molding, are preferably desired in the form of consistent size to keep them free flowing to avoid a possible inconsistency of feed to an extruder die. In order to make such pellets, the apparatus must be maintained at the initially set precision cutting form for an extended period of time, or for a continous production run. Improvements have been effected in cutting blades, in the provision of improved face plates against which these blades rotate and through which the thermoplastic strandular material is ejected into the path of such blades, and in the provision of spring-backed knives to maintain their cutting pressures. However, despite the benefit of these various improvements, it has been found that misalignment of one or more rotating parts will creep in, that one or more of the spring-back blades becomes angularly displaced, the face against which the blades operate may become gouged, to thus affect the cutting positions of the blades and destroy the initially preset cutting position to yield an irregular pellet product. Advantageously, this invention provides for a firm blade positioning and for a continuously adjusting means that is adapted to conform to the cutting face to maintain a best blade cutting position even though misalignment may occur during a production operation.

More specifically, the cutting blades are firmly set in a rigid support which is itself flexibly mounted or secured to a hub fixed to a supporting shaft. This structural arrangement provides for continuous production of substantially uniform pellets for periods of operation, yielding uniform pellets. The improvement will be more fully shown and described in the following specification and attached drawings, where:

FIGURE 1 represents a section of a pelleting apparatus including the improvement of this invention;

FIGURE 2 shows in an enlarged detail, in partial section, the shaft mounted improved cutting head of the pelleting apparatus of FIGURE 1 as seen along line 2—2 of FIGURE 3;

FIGURE 3 is a frontal view of the cutting head of FIGURE 2 taken across line 3—3 thereof showing the rigid mounting of the cutting blades;

FIGURE 4 is a frontal view of the resilient or flexible disc along line 4—4 that is utilized for holding the cutting head of FIGURE 2; and FIGURE 5 shows the hub mounting of the resilient disc of FIGURE 4, as viewed along line 5—5 of FIGURE 2.

Referring to FIGURES 1 and 2, which represent a pelleting apparatus in partial section where the cutting is done under water, pellets are cut and immediately chilled by means of a set of blades 11 rotating in a water bath 10. The rotating blades 11 are supported in a special mounting, to be hereinafter described, that is supported for rotation on a shaft 9. The blades 11 rotate in frictional engagement against a circular cutting face 25 (see FIGURE 2), sharply shearing or cutting predetermined sections of a thermoplastic strandular material 17 being extruded through equivalent sized passages, as shown.

The strand passages are contained in a heated head 18 (partially shown) which may contain any desired number of them from an extruder. The size of the pellets is predetermined by the correlation of the rate of extrusion and frequency and number of blade 11 rotation. The drawing (see also FIGURE 3) shows four blades 11 positioned at 90° intervals within a supporting head 12. The head 12, in turn, is secured to a flexible or resilient disc 13, which is itself secured to the hub 14 mounted on the shaft 9.

As shown in FIGURE 2, the hub 14 is secured to the shaft 9 by means of a key 8 and set screw 7. To the hub 14, there is fastened by studs 20 a resilient or flexible disc 13 which disc, in this instance, is of glass fibers, resin impregnated. The stud heads are accommodated in openings provided in the head 12. The blade head 12 openings are slightly larger than the heads of the studs 20 to permit relative motion of the head or plate 12 relative to the hub 14 when misalignment occurs. Further, the studs 20 secure the resilient disc 13 to the cutter holder 12 oppositely to the set of studs 21. This coupling type mounting permits continuous relative motion between the cutter head 12 and the hub 14 on the shaft 9. Since disc 13 is flexible, it will maintain a preset and desirable pressure on the cutter ring surface 25 to cleanly cut or sever, the strand 17 emerging from the cutting surface 25 in a number of positions circumferentially spaced as seen in FIGURE 3 to give desired sized pellets.

The blade 11 assembly herein described is more specifically shown in FIGURE 3. The pellet cutters or blades 11 are secured to the cutter head or plate 12 by means of studs 30, 31; a pair is preferred in each cutter blade so as to avoid any displacement whatsoever. Means such as grooves in the head are, of course, provided for their longitudinal adjustment to thus present a periodic new cutting section to the pellets.

Should an eccentricity develop in any part of the apparatus as in the shaft 9, the hub 14, or in the possible warping of the face of the cutting ring 25 from which the strandular material 17 emerges, it will be quickly and readily compensated or adjusted for through the resiliency of the plate 13 which is being continually urged, at a predetermined pressure, against face 25. The shaft 9 itself can be urged against the face plate 25 by an end-thrust spring in a state of predetermined compression (not shown). However, the resilient disc 13 mounting the blade head 12 can readily and continually readjust itself to any misalignment occurring in the pelletizer apparatus.

The disc 13 requirements are that it should be rigid in one direction and flexible in another. The disc section, depending upon material of which it is made, is of a thickness that permits necessary resiliency in adjusting itself through bending to axial misalignment of the shaft 9 and to possible face alteration of the ring 25. Materials that can be used are noncorrosive metals (stainless steel, beryllium copper), glass fibers in a resin binder, or inorganic thermoplasts such as polyesters and polyamides, and others having similar characteristics. Of these materials, a disc of glass fibers in a resin binder of epoxy resin is advantageous in that it can be used in a water bath, it is flexible, tough, and it will give service for a prolonged period of time. The metallic discs of stainless steel or of beryllium copper are somewhat more costly and also do not come up to the standard of performance of the glass fiber disc. Neither do the purely thermoplast discs with or without some reinforcement, as of glass fibers.

What is claimed is:

1. In a pellet cutting apparatus having a rotating pellet cutting blade support mounted on a shaft to rotate therewith and operating relative a cutting face comprising, a blade holder, a resilient plate to which said blade holder is secured, said plate biasing said blade holder to said cutting face, and means on said shaft supporting said plate.

2. The pellet cutting apparatus of claim 1 where the resilient plate is a disc of inorganic thermoplastic material in an organic thermoplastic binder.

3. The pellet cutting apparatus of claim 1 where the resilient plate is a disc of glass fibers in a resin binder.

4. The pellet cutting apparatus of claim 1 where the resilient plate is a disc of organic thermoplastic.

5. The pellet cutting apparatus of claim 1 where the resilient plate is a disc of metallic material.

References Cited by the Examiner

UNITED STATES PATENTS

| | | | |
|---|---|---|---|
| 2,818,701 | 12/1959 | Hull et al. | 18—1 X |
| 2,953,179 | 9/1960 | Friess | 146—192 |
| 3,196,487 | 7/1965 | Snelling | 18—12 |

WILLIAM J. STEPHENSON, *Primary Examiner.*